C. M. MANLY.
VARIABLE SPEED POWER TRANSMITTING MECHANISM.
APPLICATION FILED JULY 19, 1911.
1,206,453.
Patented Nov. 28, 1916.
8 SHEETS—SHEET 4.
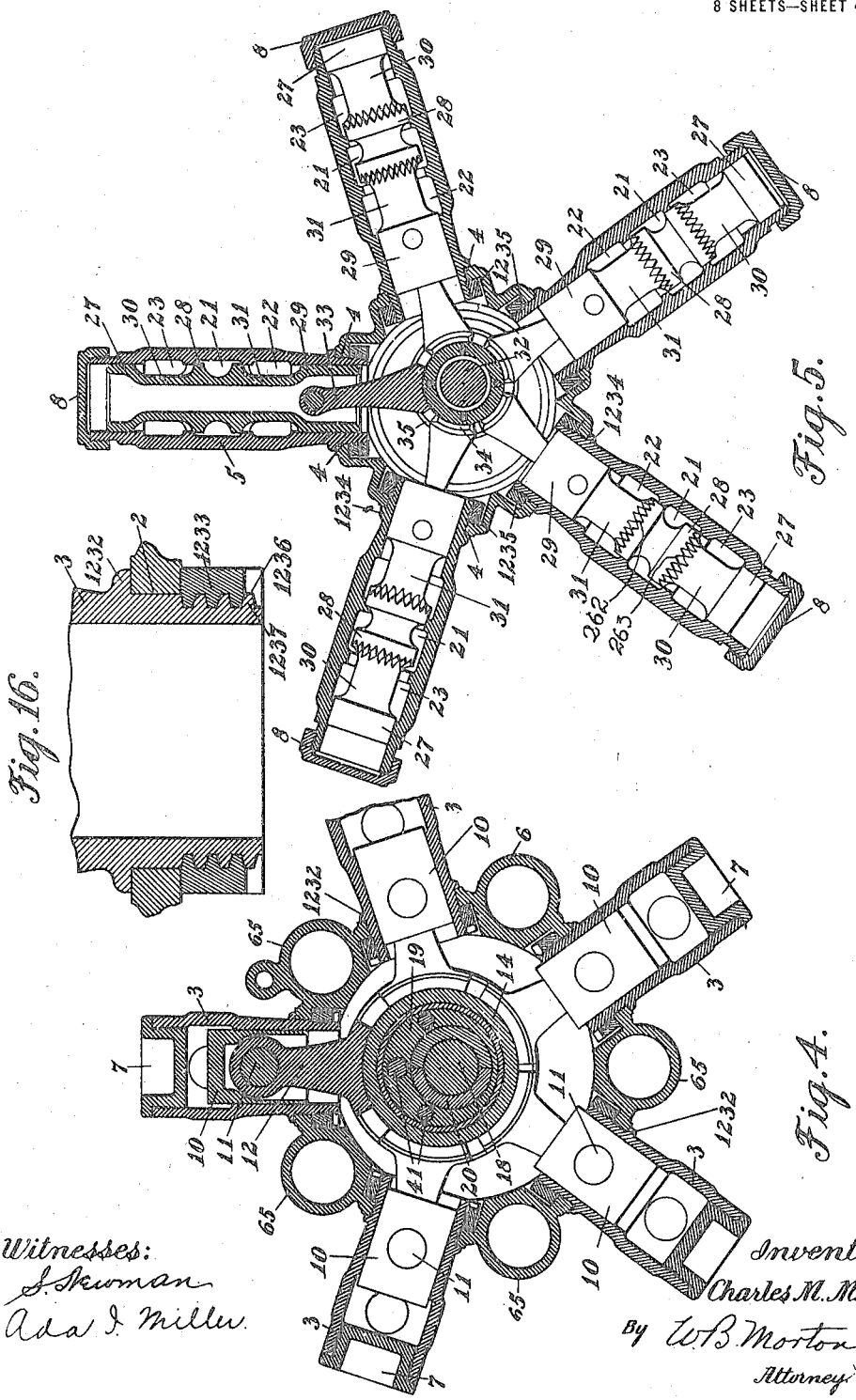

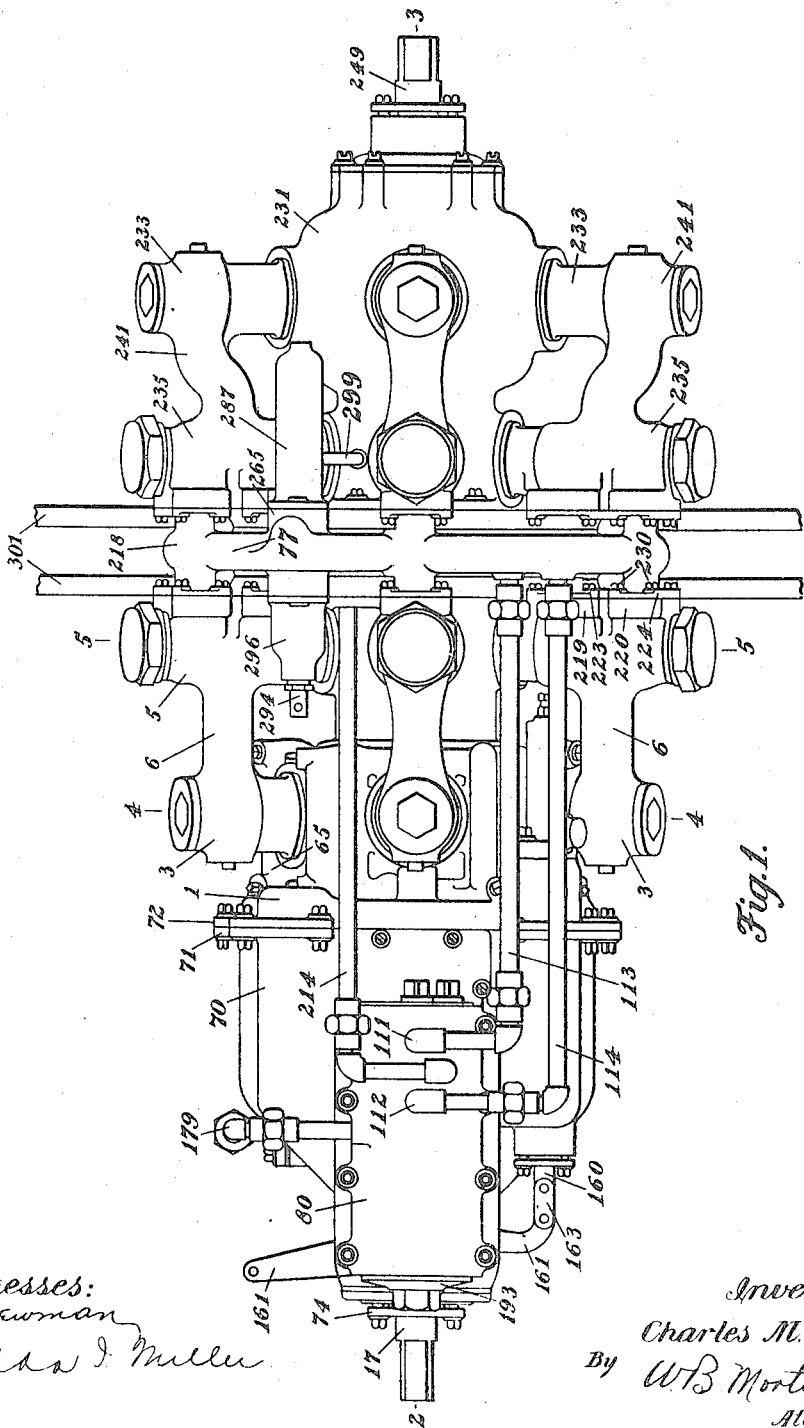

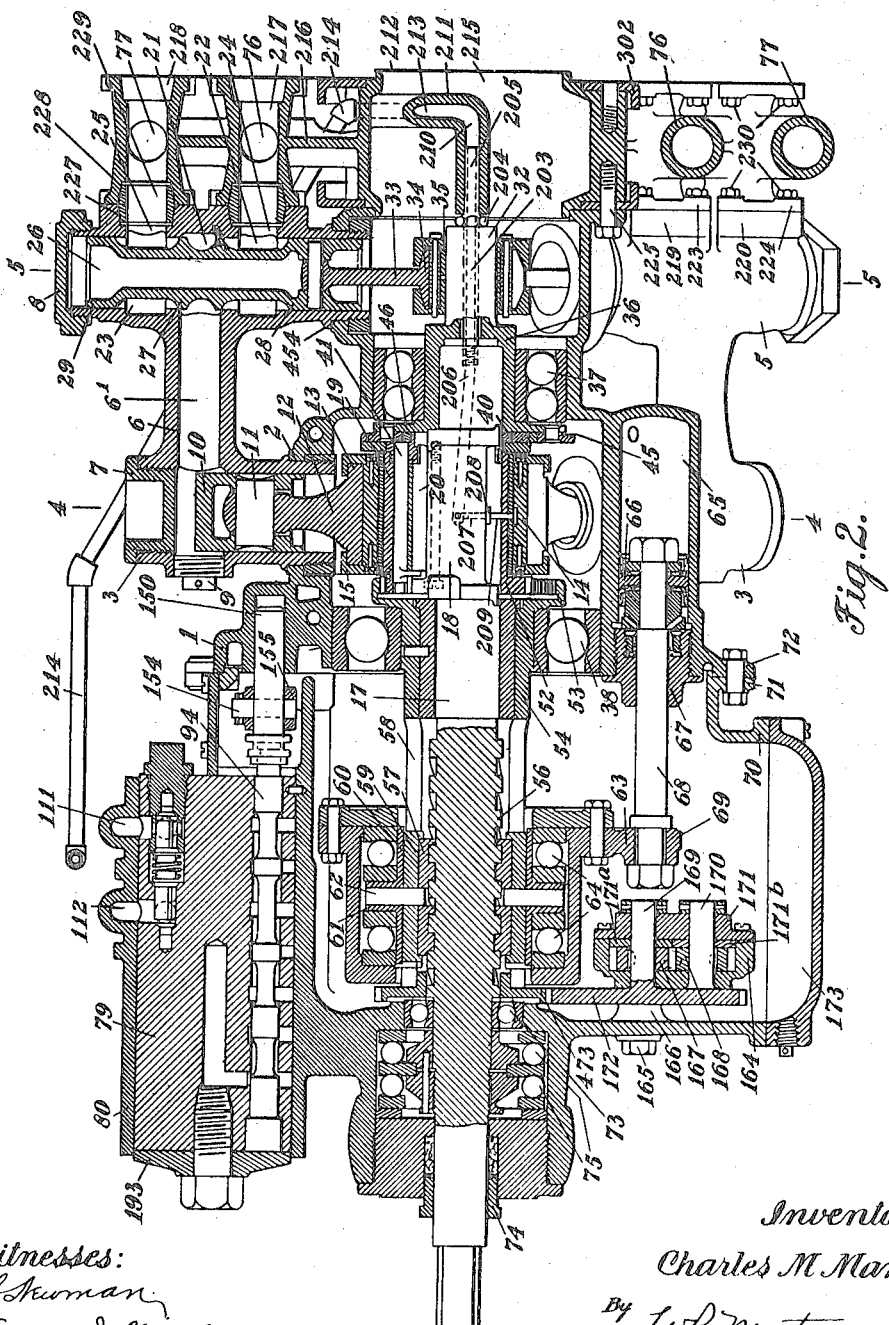

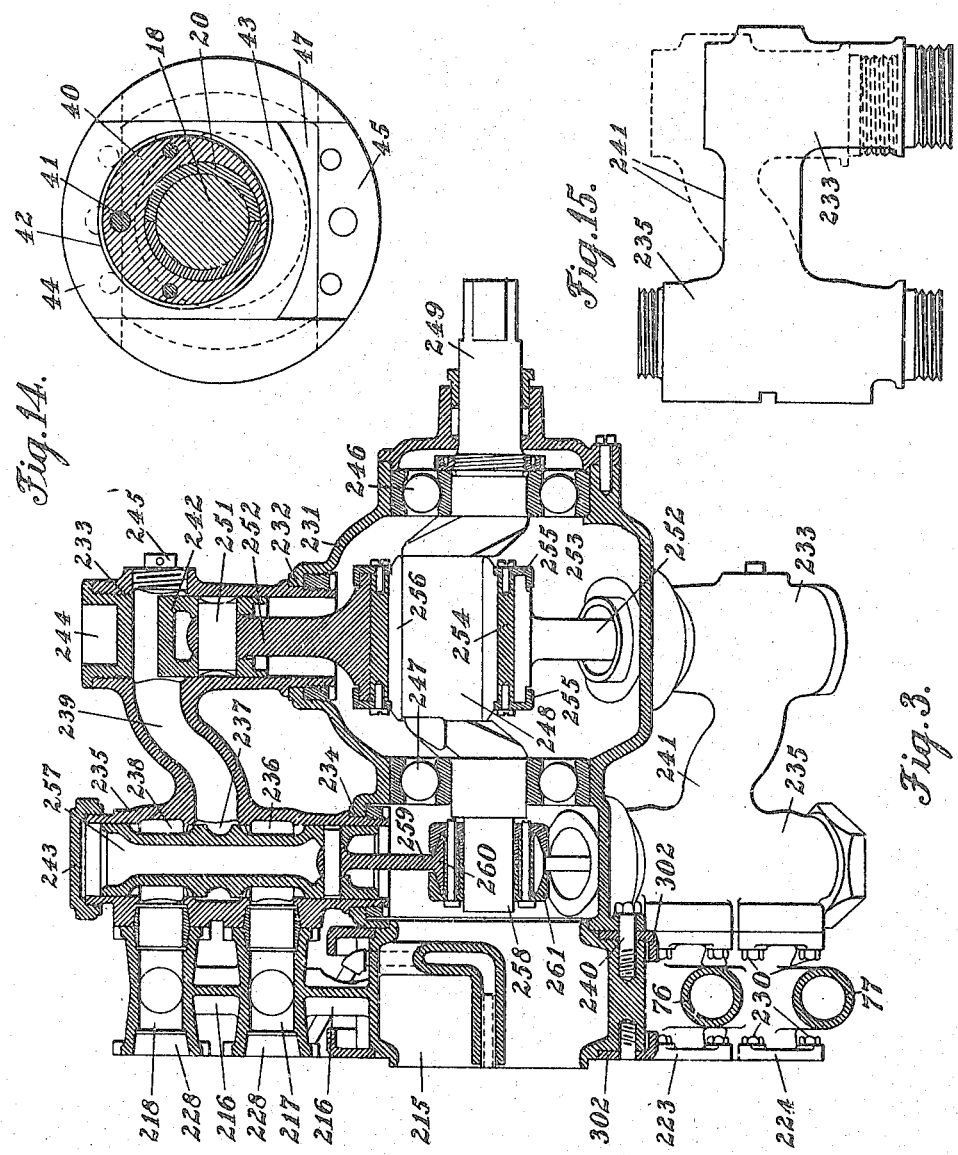

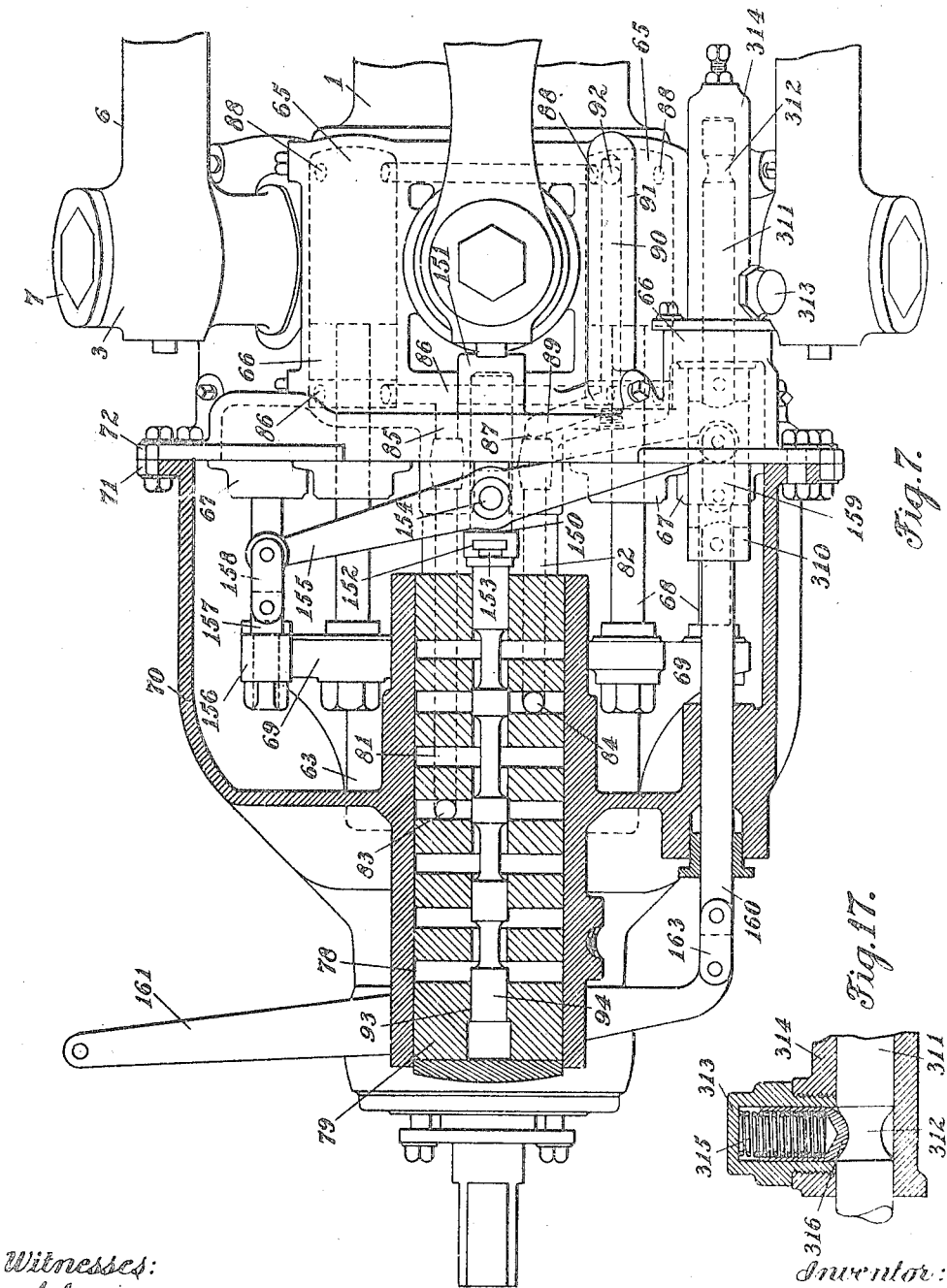

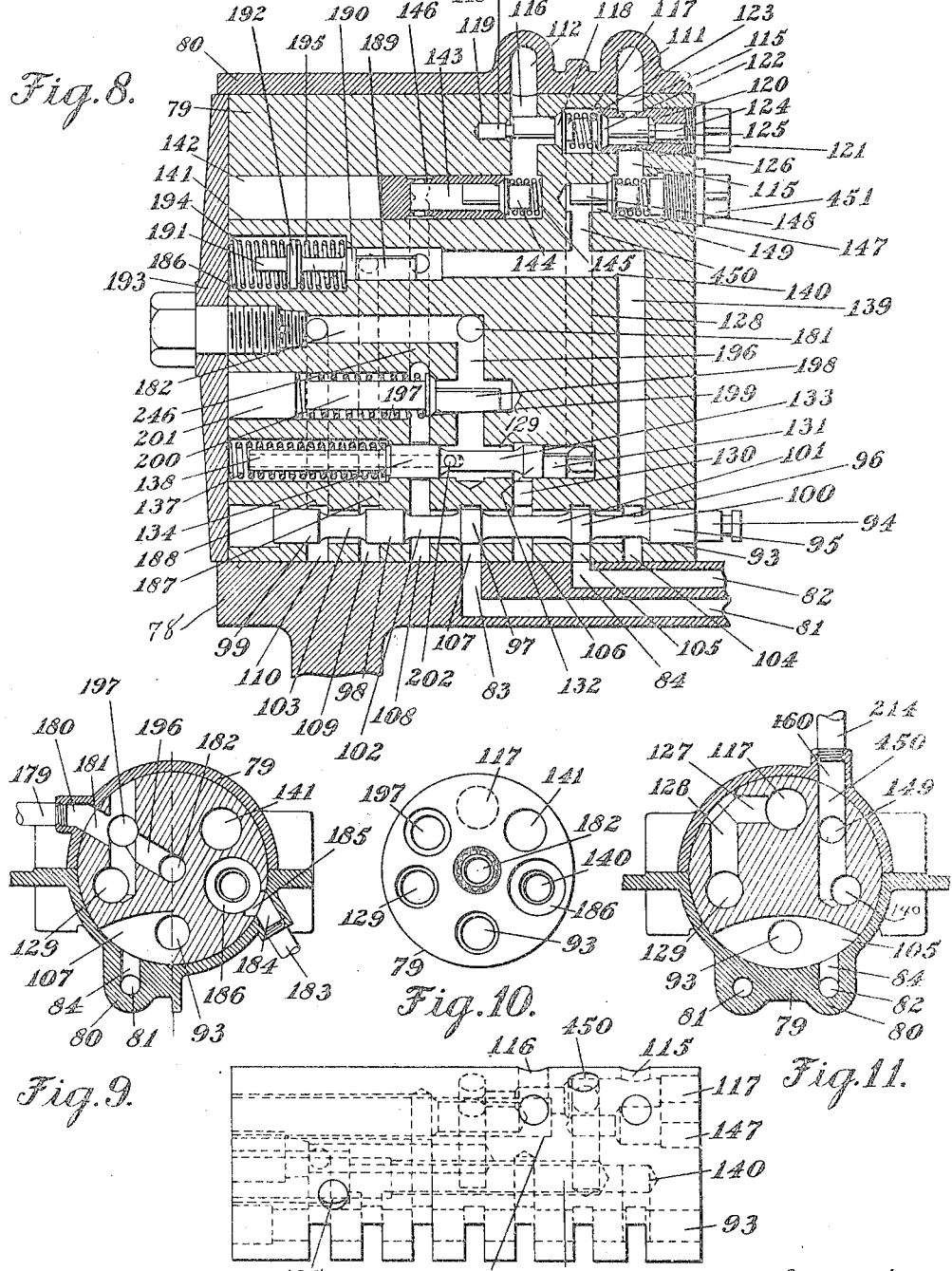

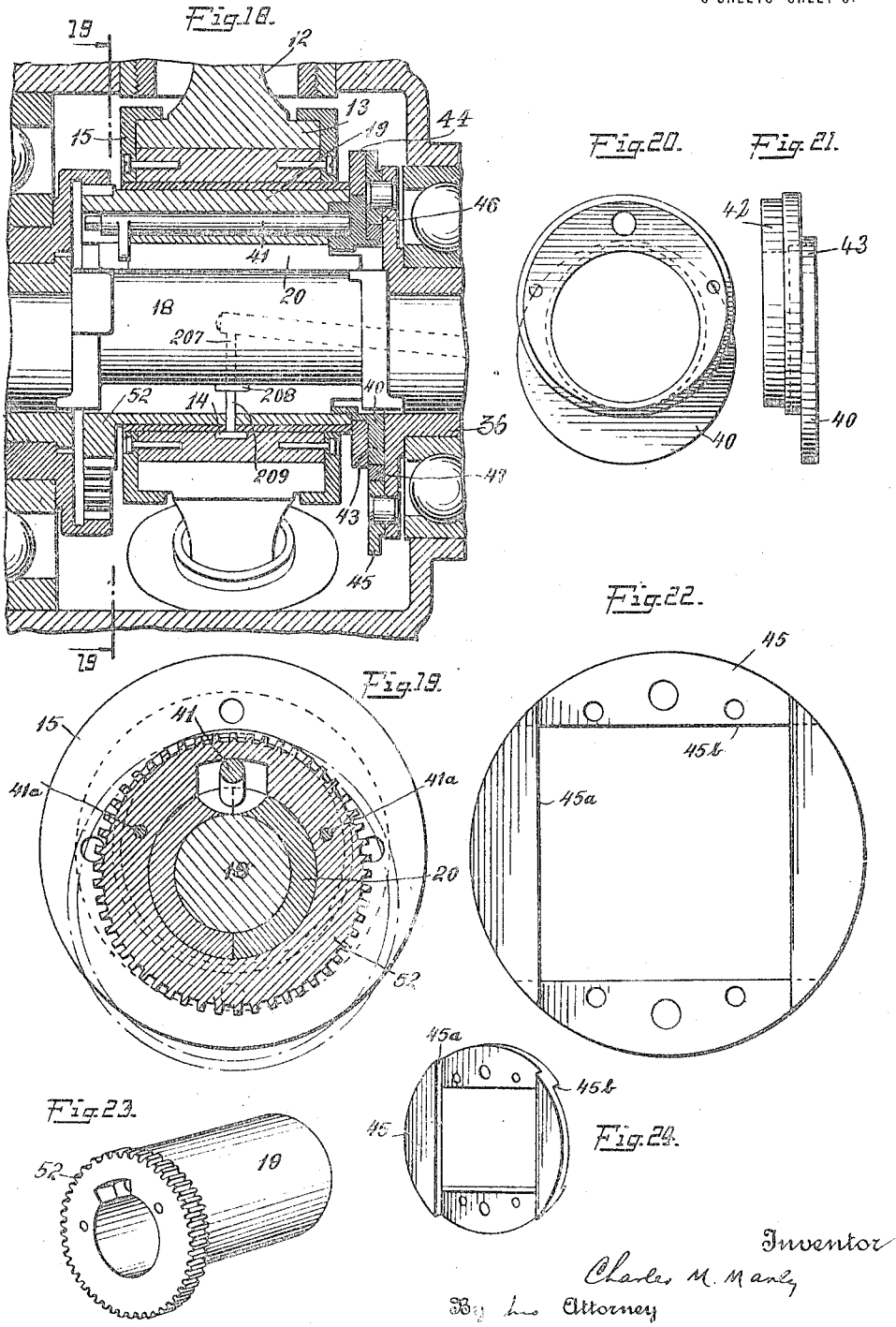

UNITED STATES PATENT OFFICE.

CHARLES MATTHEWS MANLY, OF FREEPORT, NEW YORK.

VARIABLE-SPEED POWER-TRANSMITTING MECHANISM.

1,206,453.

Specification of Letters Patent.  Patented Nov. 28, 1916.

Application filed July 19, 1911. Serial No. 639,464.

*To all whom it may concern:*

Be it known that I, CHARLES M. MANLY, a citizen of the United States, residing at Freeport, Long Island, New York, have invented certain new and useful Improvements in Variable-Speed Power-Transmitting Mechanisms, of which the following is a specification.

My invention relates to variable speed power transmitting mechanisms in which a variable stroke pumping mechanism and a motor operated by the fluid delivered from the pump are interposed between a prime mover and a driven device, and particularly to that type of such mechanisms disclosed in my U. S. Patent No. 801,097 dated October 3, 1905, and my application, Serial No. 399,989 filed October 31, 1907.

One object of my invention is to provide an improved simple and effective means in such mechanisms for varying the stroke of the pumping device and thereby varying the velocity and torque ratio of the prime mover to the driven device.

A further object of my invention is to provide an improved construction and arrangement of the parts whereby the weight of, and space occupied by a transmitting mechanism capable of transmitting a given power may be materially reduced.

With these and other objects in view the invention consists in the novel features of construction, combinations, and arrangements of parts illustrated in the accompanying drawings, and hereinafter described and pointed out in the appended claims.

Figure 6:
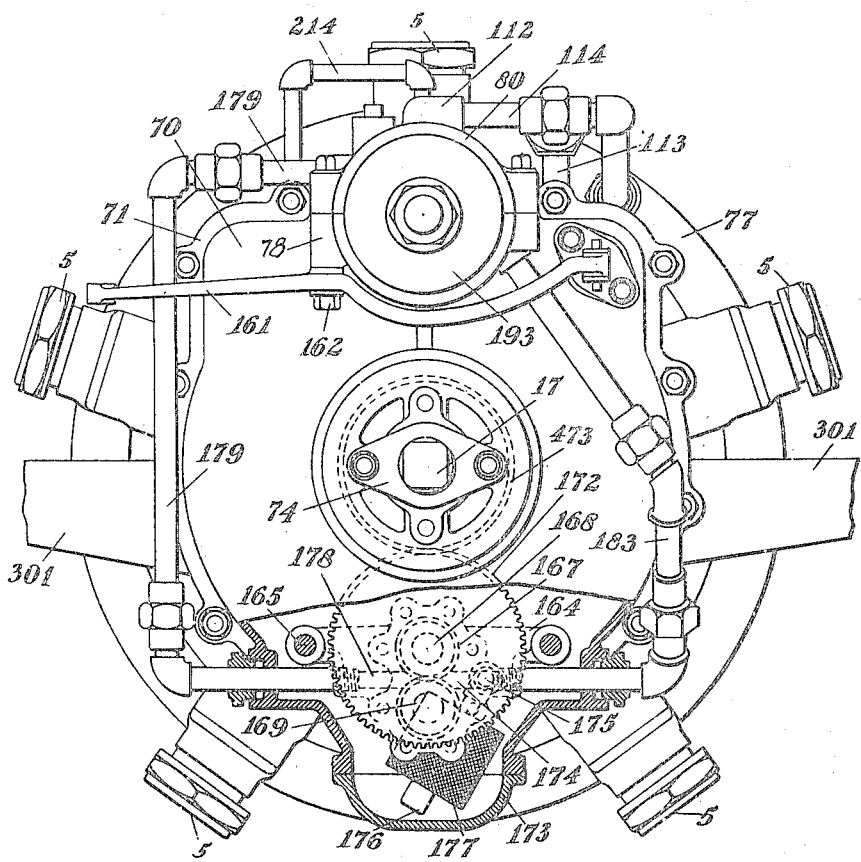

In the said drawings,—Figure 1 is a plan view of the entire transmission. Fig. 2 is a longitudinal vertical section through the pump portion of the transmission. Fig. 3 is a similar view of the motor; Figs. 2 and 3 taken together constituting a section of the entire transmission on the line 2—3 of Fig. 1 with the connections between the pump and motor shown in both views. Fig. 4 is a transverse vertical section on line 4—4 Figs. 1 and 2. Fig. 5 is a transverse vertical section on line 5—5 Figs. 1 and 2. Fig. 6 is an end elevation, partly in section, of the transmission as viewed from the left in Figs. 1 and 2. Fig. 7 is a plan view partly in section of a portion of the transmission at the left of Figs. 1 and 2. Fig. 8 is a diagrammatic sectional view showing the arrangement of the valves for controlling the fluid pressure operated stroke adjusting mechanism. Figs. 9, 10, 11 and 12 are detail views of the valve block hereinafter referred to. Figs. 13, 14, 15, 16 and 17 are detail views of other portions of the mechanism hereinafter referred to. Fig. 18 is a longitudinal section of the adjustable crank mechanism on the same plane as Fig. 2, but showing the parts on an enlarged scale; Fig. 19 is a section on line 19—19 of Fig. 18; Figs. 20 and 21 are detail views and side and end views respectively of the eccentric for adjusting the valve cranks; Fig. 22 is a detail view of another element of the valve crank adjusting mechanism; Fig. 23 is a perspective view of the eccentric bushing for operating the pump pistons; and Fig. 24 is a perspective view of the elements shown in Fig. 22.

Referring now to the drawings in which like reference characters indicate like parts throughout the several views, 1 indicates the crank casing of the pump element of the transmission, which is preferably formed of a single casting. Formed in the crank casing and arranged radially around a common center are five bores 2 for receiving the pump cylinders 3 and five similarly arranged bores 4 for receiving the valve chambers 5 of the pump cylinders. (See Fig. 2). In my prior patent and application above referred to the cylinders and valve chambers are cast integral with the crank casing but in the construction forming the subject matter of this application I make the cylinders and their crank chambers separate from the crank casing in order that they may be made of stronger and more suitable material, preferably steel. To form a tight joint between the cylinders and crank casing, the cylinders are provided with flanges 1232 which are machined off flat on their lower faces and are held against machined surfaces on the casing surrounding the bores 2 by clamping nuts 1233 threaded on the ends of the cylinders within the casing. The valve chambers are provided with similar shoulders 1234, and similar clamping nuts 1235. I have found it advantageous to use a special thread such as that shown in Fig. 16 for the above connections. This thread is but slightly narrower at the top 1236 than at the base 1237.

Instead of coming to a sharp edge as the ordinary thread of V-shaped cross section, the angle between the side of the thread and a diametric line of the nut or cylinder is less than the angle representing the coefficient of friction of the engaging surfaces. When a threaded joint having ordinary threads with sharply inclined sides is drawn tight, considerable radial thrust is produced which tends to contract the male member and expand the female member; hence when the male member is a cylinder having a closely fitting piston working therein such contraction would cause the piston to bind. In a construction of this character the nut has to be drawn up tight enough to put a tension on the metal of the cylinder between the flange and nut considerably greater than the tension produced by the working pressure of the fluid in order to hold the joint fluid tight at all times and as the working pressure of the fluid frequently rises to several thousand pounds per square inch, it is readily seen that the radial thrust produced by a nut having a thread of usual construction would be very great. With my improved nut there can be no radial thrust at any pressure, for the friction increases directly as the pressure and the angle producing the radial thrust is less than the coefficient of friction.

Each cylinder and its valve chamber are connected by an integral member 6 extending from the top of the cylinder to an intermediate point of the valve chamber and having a passage 6' therethrough for the fluid. Each cylinder, valve chamber and connection is preferably formed of a single steel forging, the cylinders and chambers being bored through from end to end. Each cylinder is closed at its outer end by a plug 7 and each valve chamber is closed by a cap 8. The connecting passages are formed by boring through the cylinders and connecting members into the valve chambers, the openings in the walls of the cylinders being closed by suitable plugs 9.

Slidably mounted in each of the cylinders 3 is a piston 10 and attached to each piston by means of a cross pin 11 to have a rocking connection therewith is a piston rod 12. The piston rods are provided at their inner ends with curved shoes 13 which fit against the outer surfaces of a tubular bushing 14. The shoes are held against longitudinal displacement on the bushing by means of rings 15 attached to the end faces of the bushing and having flanges which project over the ends of the shoes, the construction being such that circular motion imparted to the bushing, as by a crank, will simultaneously and progressively operate all the pistons.

Rotatably mounted in the casing 1 by means of bearings 37, 38 on either side of the cylinders 3 is a crank shaft 17, the crank pin 18 of which is encircled by an eccentric bushing 19, spaced therefrom by a two part bushing 20 for convenience in assembling. After the parts are assembled on the crank pin, which is accomplished by inserting one half of the bushing 20 at a time, and working the halves around until they occupy the desired position, the split bushing is locked to the eccentric bushing by means of a pin 41 in the eccentric bushing, which pin is provided with a lug as shown in Figs. 18 and 19, which engages a suitable recess formed in the meeting edges of the split bushing when the pin is turned to the position shown in the above mentioned figures of the drawing. The eccentric bushing 19 works in an anti-friction bushing in the tubular bushing 14 to which the piston rods are connected as described above, and the eccentricity of the bushing is exactly equal to the eccentricity of the crank pin 18. It will therefore be clear that by adjusting the eccentric bushing to different positions around the crank pin 18, the stroke of the pistons produced by the rotation of the crank shaft may be varied from their maximum stroke, equal to twice the eccentricity of the crank, when the center of the outer periphery of the bushing is in the same radial line with the center of the crank and on the same side of the center of rotation of the crank shaft, to no-stroke, when the center of the eccentric bushing coincides with the center of rotation. In the drawings, the parts are shown in the maximum stroke position and the no-stroke position is obtained by rotating the eccentric bushing around the crank through an angular distance of 180 degrees. Rotation of the eccentric bushing beyond this point causes the stroke of the pistons to increase, and, by means of the valve mechanism which will now be described, causes the direction of the flow of the fluid to be reversed, thereby reversing the motor element of the transmission.

Formed in each of the valve chambers are three recesses or ports, 21, 22, 23, the middle one 21 connecting with the passage 6' leading from its respective pump cylinder 3. The inner 22 and outer port 23 connect with bores 24, 25 respectively in the side wall of the valve chamber opposite the passage 6', which bores connect the ports 22, 23 with inner and outer manifolds 76, 77, forming an intermediate connection between the pump and motor, as will be later described. Slidingly mounted in each of the valve chambers 5 is a piston valve 26 having three heads 27, 28, 29 separated from each other by two intermediate necks 30 and 31, the neck 30 being the outer neck between the outer head 27 and the middle head 28, the neck 31 being between the middle head and the inner head 29.

The middle head 28 of the valve is of a width substantially equal to the width of the port 21 so that reciprocation of the valve connects the ports 24, 25 alternately with the passage 6', with momentary periods when each of the ports is closed at the time when the middle head exactly covers the port 21.

The valves are all operated from a common crank pin 32 to which they are operatively connected by means of connecting rods 33 having rocking connection with the valves and provided with shoes 34 embracing the crank pin 32 and held in place thereon by the retaining rings 35. The valve crank pin is formed integral with, but eccentric to a sleeve 36 rotatably mounted on the end of the crank shaft 17, the rotatable member of the bearing 37 being attached to the sleeve. As the direction of the flow of fluid in the passages 6' is reversed when the direction of movement of the pump pistons is reversed at each end of their strokes, it is obvious that the crank arm of the valve crank pin must be positioned an angular distance of 90 degrees from the real crank arm of the pump pistons.

The real crank arm of the pistons is a line drawn from the center of the outer periphery of the eccentric bushing 19 to the center of rotation of the crank shaft 17 and this line changes angularly with the adjustment of the eccentric bushing, but at only half the rate that the bushing is rotated on the crank pin; therefore the valve crank pin must be connected to the bushing by some mechanism that causes the crank pin to move around the center of rotation of the crank shaft 17 out of line with the bushing 19 and with a two to one reduction of the angular rate of the adjustment of the bushing. This mechanism has been fully disclosed in my application above referred to in connection with a different type of valve. It consists of a double eccentric piece 40 fitted into the right hand end of the eccentric bushing 19 and prevented from turning with respect thereto by the pin 41 previously described and the additional pins 41$^a$. The double eccentric (see Figs. 20 and 21) comprises one eccentric 42 concentric with the outer periphery of the bushing 19 and another eccentric 43 concentric with the crank shaft 17 when the parts are in the maximum stroke position as shown in the drawings, the two eccentrics being therefore eccentric to each other an amount double the eccentricity of the crank pin 18. Rotatably mounted on the eccentric 42 is a square shoe 44 which fits in and is free to slide in a vertical slot 45$^a$ in a plate 45 shown detached in Figs. 22 and 24. The plate 45 comprises a disk having slots in its opposite faces, the slot 45$^a$ of the plate adjacent the crankshaft, and the opposite slot 45$^b$ being at right angles to the slot 45$^a$. The slots are equal in depth to half the thickness of the plate, whereby the two slots form a square central opening where the slots cross each other. The plate is fixedly attached to a flange 46 on the end of the sleeve 36 of the valve crank pin, and rotatably mounted on the eccentric 43 is a square shoe 47 which fits in, and is free to slide in the slot 45$^b$ which is in line with the crank arm of the valve crank pin 32. In the operation of adjusting the stroke the eccentrics 42 and 43 turn on the crank pin 18 as a center with the eccentric bushing 19, and by means of the crossed shoes turn the sleeve 36 on the crank shaft 17 as a center at exactly one half the angular rate that the bushing is turned on the crank pin 18. When the pump stroke is adjusted from one side to the other of its no-stroke position, the relative positions of the real crank arm of the pump pistons and the crank pin of the pump valves is reversed, that is, the valve crank pin instead of being 90 degrees angularly in advance of the real crank of the pump piston in the direction of rotation of the pump shaft 17 becomes 90 degrees angularly behind the real crank arm of the pump pistons, and thereby the direction of flow of the fluid and the direction of rotation of the motor is reversed.

The sleeve 36 of the valve crank pin is held against longitudinal displacement on the shaft 17 by means of a tubular bolt 203 screwed into the crank shaft at a point co-incident with its center of rotation and extending through a longitudinal bore in the valve crank pin 32. The bolt 203 has a head 204 which engages the end face of the crank pin and an integral extension 205 beyond the head. The bolt is tubular as described and its bore connects with a bore 206 in the crank shaft 17 leading to the center of the crank pin 18 as shown in Fig. 2. Radial holes 207 in the crank pin 18 communicate with the bore 206 and registering with the holes 207 are oil grooves 208 in the inner face of the two part bushing 20. Radial holes 209 are formed in the bushing 20 and the eccentric bushing 19 to permit oil to pass to and lubricate the bearing between the eccentric bushing and the bushing within the bushing 14, which carries the pump pistons. The extension 205 of the bolt 203 rotates in a bearing 210 formed in a member 211 projecting into the central chamber of the manifold casting 212 and integral therewith. A radial bore 213 in the member 211 connects with the bearing 210 and connecting with the bore 213 is a pipe 214 through which oil is delivered as hereinafter set forth to lubricate the bearings described.

The manifold casting 212 comprises a central cylindrical chamber 215 of substantially the same size as the pump casing 1 and the inner and outer concentric annular manifolds 76 and 77, connected to each other and to the central chamber 215 by integral radial webs 216. Intersecting the manifolds 76 and 77 respectively, and formed integral therewith, are five longitudinally extending tubular members 217, the bores of which register with the inner ports 24 of the pump valve chambers, and five similar members 218 whose bores register with the outer ports 25. The central chamber of the manifold is connected to the pump casing by bolts 225 as shown in Fig. 1, and each of the members 217, 218 is connected to its valve chamber around the ports 24, 25 by a fluid tight connection of special construction, which will now be described. The valve chambers are all formed with flanges 219, 220 surrounding the ports 24, 25 respectively and these flanges are machined so that their faces around the ports all lie in the same transverse plane. Similarly, the tubular members 217, 218 are provided with flanges 223, 224 having machined faces also all lying in the same transverse plane. The ports 24 and 25 and the bores of the members 217, 218 are formed with tapering counterbores 227, 228 respectively, and fitting in the counterbores are non-resilient bushings 229, preferably of annealed copper, whose outer surfaces taper in opposite directions from the center to coact with the surfaces of the counterbores. The copper bushings are made somewhat larger than the counterbores and their bores are correspondingly larger than the ports 24, 25 and the bores of the members 217, 218 so that when in assembling the machine, the faces of the flanges 223, 224 are drawn up against the faces of the flanges 219, 220 by the bolts 230 in the flanges, the bushings will be contracted and reduced in size until their bores are the same size as the ports 24, 25 and the bores of the members 217, 218. I have found that a joint of this character will be tight under any pressure up to the breaking point of the casting, in fact, the higher the pressure the tighter the joint becomes, for the copper bushings are expanded by the fluid pressure in their bores against their counterbores with a pressure increasing as the pressure of the fluid. Joints of this improved type are particularly advantageous in a machine of this character where there are a plurality of joints to be made between the same two inflexible members for the reason that the degree of pressure that they will withstand is not dependent upon the pressure with which the engaging faces of the members are held in contact, as is the case with an ordinary ground or gasket connection. It is practically impossible at a cost that is not prohibitive to make all the meeting faces of the flanges 219, 220, 223, 224 absolutely accurate so that they can all be drawn up with sufficient pressure to hold a ground or gasket connection fluid tight against the working pressure of the fluid, but with my improved connection the bolts 230 have only to be drawn tight enough to compress the copper bushings and bring the engaging faces into contact to make a perfectly tight joint at any pressure.

The motor element of the transmission (see Fig. 3) comprises a crank casing 231 having five radial bores 232 to receive the motor cylinders 233, and five bores 234 to receive the motor valve chambers 235. The motor valve chambers are identical with the pump valve chambers, the three ports 236, 237, 238 thereof, connecting respectively with the inner manifold 76, the passage 239 to the motor cylinders, and the outer manifold 77. The motor valve chambers are connected to the manifolds by joints similar to those between the pump valve chambers and the manifolds, and the crank casing 231 is attached to the central chamber 215 of the manifold casting by bolts 240. Each motor cylinder 233 and its valve chamber 235 are preferably formed of one integral steel forging with a connecting member 241 generally similar to the pump cylinders and valve chambers except that the connecting members are curved outwardly from the valve chambers to the motor cylinders in order that the motor pistons 242 may have a longer stroke than the maximum stroke of the pump pistons. To make the motor cylinders and valve chambers I first forge the parts with the connecting member straight as shown in full lines, in Fig. 15 and then bore through the cylinder and chamber, from end to end for the piston and valve and bore through the wall of the cylinder and the connecting member 241 to form the passage 239. I then heat the connecting members and bend them to bring the valve chambers and cylinders to the desired relative positions.

The outer ends of the valve chambers are closed by caps 243 and the outer ends of the cylinders are closed by plugs 244 and the holes through the walls of the cylinders by plugs 245. The motor cylinders and valve chambers are attached to the crank casing in the same manner as the pump cylinders and valve chambers.

Rotatably supported in the crank casing 231 by bearings 246, 247, on either side of its crank pin 248, is a crank shaft 249 which constitutes the driven shaft of the transmission. The pistons 242 are slidably mounted in the motor cylinders 233 and connected to the pistons by cross pins 251 are piston rods 252 generally similar to, but larger than, the piston rods of the pump to accommodate the greater throw of the crank. The inner ends of the piston rods are formed as shoes 253 and work against a tubular bushing 254 with which they are maintained in working relation by flanged rings 255 attached to the end faces of the bushing. For convenience in assembling, the bushing 254 is spaced from the crank 248 by a two part bushing 256. Slidingly mounted in the valve chambers 235 are piston valves 257 identical with the valves 26 of the pump whereby fluid connection is established between the manifold 76 and the passage 239 and between the manifold 77 and the passage 239, alternately, whereby fluid under pressure from the pump delivered through either manifold will reciprocate the pistons 242 and rotate the crank shaft in one or the other direction according to which manifold is the source of the fluid pressure. The valves 257 are connected for operation to a crank pin 258 projecting from the inner end face of the crank shaft 249, by rods 259 having shoes 260 held by flanged rings 261 all identical with the corresponding parts of the pump valve connections. The valve crank pin is 90 degrees distant angularly from the crank pin 248.

I have above stated that the middle heads of the pump valves are made of a width substantially equal to the width of the middle ports of their valve chambers and that the valves and valve chambers of the motor are identical with those of the pump. In the drawings I have shown the middle heads of the valves as having V notches 262 and 263 formed in its edges for the purpose of giving a gradual opening and closing of the middle port. The exact construction of this feature of the valves and the advantages resultant therefrom are fully disclosed in my pending application No. 606,618 filed February 4, 1911, and such feature is covered in the claims thereof, to which application reference is therefore here made.

The transmission may be conveniently supported by brackets, shown in Figs. 1, 2, 3 and 4, having projecting arms 301 for attachment to a suitable base and central annular bearing portions 302 which engage the ends of the central chamber of the manifold casting and are held in place by the bolts 225 between the pump crank casing and the manifold casting, and the bolts 240 between the motor crank casing and the manifold casting.

The mechanism for controlling and varying the position of the eccentric bushing 19 on the crank pin 18 of the pump crank shaft will now be described. Formed on the end of the eccentric bushing adjacent the bearing 38 is a spur gear 52 concentric with the crank pin 18, and meshing with this gear is an internal gear 53 formed on the end of a sleeve 54 surrounding the shaft 17 and spaced therefrom by a two part bushing.

The gear 53 is concentric with the shaft 17 and the sleeve 54 extends through and beyond the bearing 38 and carries the rotary member of the said bearing. To the left of the bearing 38 the crank shaft 17 is formed with a screw thread 56 on which a nut 57 is mounted. The sleeve 54 surrounds the nut 57 and is provided with four longitudinal slots 58, of a length substantially equal to the threaded portion of the shaft, in each of which is arranged a shoe 59 and surrounding the slotted sleeve 54 and the shoes 59 is a sleeve 60 provided with a collar 61, the nut 57, shoes 59, and sleeve 60 being fastened together by pins 62 in the collar 61. Surrounding the sleeve 60 is a two part yoke 63 and interposed between the flanges of the yoke and the collar 61 are ball bearings 64, the construction being such that longitudinal movement of the yoke will move the nut along the threads 56 and cause relative rotary movement of the sleeve 54 and the shaft 17 and thereby through the medium of the gears 53 and 52 turn the eccentric bushing 19 around the crank pin 18 to vary the stroke of the pump pistons as described above.

Means are provided to utilize the fluid pressure in the transmission for shifting the yoke. This means comprises five cylinders 65 formed in the pump casing 1 between the bores 2 for the cylinders 3, in each of which a piston 66 is mounted for reciprocation. The cylinders 65 are closed by plugs 67 having central packed bores through which the rods 68 of the pistons 66 reciprocate, the said rods being connected to radially extending ears 69 on the yoke 63. All of the cylinders 65 are connected together at each end by bores 86, 88 (see Fig. 7) so that fluid under pressure may be admitted simultaneously to all the cylinders on either side of the pistons to shift the yoke 63 in either direction as desired. Inclosing the yoke and piston rods and the left hand end of the shaft 17 is a casing 70 hereinafter termed the control casing. This casing is provided with an annular flange 71 which is bolted to a similar flange 72 on the pump casing 1, and at its other end is provided with a bearing 73 for the shaft 17 and a stuffing box 74 surrounding the shaft. Between the bearing 73 and the stuffing box 74 a double thrust bearing 75 is arranged to hold the shaft against longitudinal displacement in the casing. The top wall of the control casing 70 is formed to provide a semi-cylindrical seat 78 in which is mounted a cylindrical valve block 79, held in place by a semi-cylindrical cap 80 bolted to the casing on each side of the valve block. The contacting surfaces of the valve block and the casing and cap are packed by an intermediate perforated sheet of fibrous material to be fluid tight so that fluid admitted to ports in the casing and cap may pass into registering ports in the valve block and vice versa, without leakage. Formed in the web of the casing 70 between the seat 78 and the interior of the casing are two bores 81, 82, leading from the end of the casing adjacent the pump casing, and communicating with these bores are two bores or drill holes 83, 84, respectively, opening into the bottom of the seat 78 at different points longitudinally thereof. The bore 81 is connected by a fluid tight connection of the special character described above to a bore 85 leading into one of the bores 86 which connect the front ends of the adjusting cylinders 65, and the bore 82 is connected by a similar connection to a drill hole 87 extending a short distance longitudinally into the pump casing 1. Extending outwardly from the drill hole 87 is a drill hole 89 which communicates with a passage 90 formed in a ridge 91 on the outer wall of one of the adjusting cylinders 65 and extending to a port 92 leading into the cylinder at a point adjacent its rear end. As the cylinders 65 are all connected, it will be clear that fluid connection is established through the ports and passages described between the ports 83, 84, in the valve block casing, and the front and rear ends respectively of the adjusting cylinders 65.

The mechanism for controlling the passage of fluid to and from the adjusting cylinders will now be described.

Extending longitudinally through the valve block 79 is a bore 93 in which is mounted a piston valve 94, as shown in Figs. 2, 3, 7 and 8. In Fig. 8 to which attention is now especially directed, I have shown the valve block diagrammatically in section with all the valves in the same vertical plane for the sake of clearness of illustration, and in order that the circulation of the fluid during the adjusting operation may be easily followed; but it will be understood that as actually constructed the valves are arranged in different planes both axially and radially from that shown in this figure, Figs. 9, 10, 11 and 12 showing the true arrangement of the passages in the valve block. The valve 94 is provided with five heads, 95, 96, 97, 98 and 99 and with four reduced portions or necks 100, 101, 102 and 103 between the heads. Extending radially into the bore 93 of the adjusting valve from the lower side of the valve block are seven equally spaced slots or ports, 104, 105, 106, 107, 108, 109, 110, of which ports 105 and 107 register respectively with ports 83 and 84 leading to the adjusting cylinders 65. The heads 96 and 97 of the adjusting valve 94 normally close the ports 105 and 107 so that no fluid can pass to or from the adjusting cylinders 65 except when the valve 94 is operated, as will be presently described. Formed in the cap 80 of the valve block are two passages 111, 112 which are connected by means of pipes 113, 114 to the inner and outer manifolds 76 and 77 respectively, as shown in Fig. 1.

Registering with the passage 111 is a bore or drill hole 115 extending a short distance downwardly into the valve block and registering with the passage 112 is a similar bore 116. The bores 115 and 116 are connected by a longitudinal passage 117 drilled into the block from its rear face. The inner or forward end of the passage 117 is reduced in size before reaching the bore 116 and the shoulder formed by the reduction is ground to form a seat for a check valve 118, the stem 118$^a$ of which crosses the bore 116 and is guided in a small hole 119 forming a reduced continuation of the passage 117. Threaded in the passage 117 and closing the same, is a plug 120 having a central longitudinal bore 121 in its inner end. The end of the plug is ground to form a valve seat around the bore 121 against which a check valve 122 is held by a spring 123 arranged between this valve and the valve 118 to normally hold both valves closed. The valve 122 has a ribbed or cut-away stem 124 working in the bore of the plug, which stem has a reduced cylindrical stem 125 working in a small hole forming a reduced continuation of the bore 121, for a purpose to be hereinafter described. A hole 126 registering with the bore 115 extends across the plug 120 to permit fluid to pass from the bore 115 to the bore 121 of the plug, and also to pass through the plug from the inner end of the bore 115. Leading from the passage 117 at a point between the valves 118 and 122 is a horizontal transverse passage 127, shown best in Fig. 11, communicating with a vertical transverse passage 128 which latter passage connects at its lower end with a bore 129 parallel with the bore of the adjusting valve 94 and extending into the valve block from its front end. Connecting the bore 129 at a point to the left of the passage 128 with the bore 93 of the adjusting valve is a counterbored port 130 registering with the port 106 between the ports 105, 107 leading to the ends of the adjusting cylinders as described above. A valve 131 having a head 132 arranged to normally lie between the passage 128 and port 130 is slidably mounted in the bore 129. The valve 131 is formed with a reduced stem 133 extending between the head 132 and a second head 134, the purpose of which will be hereinafter explained. The bore 129 is enlarged beyond the head 134 and arranged therein and engaging the head 134 is a spring 137 surrounding a reduced stem 138 of the valve and abutting against the end plate 193 of the valve block. Connecting with the slot 104 at the right of the head 96 of the valve 94 is a vertical passage 139 which communicates with a horizontal passage 140 bored into the block from the front face. A horizontal passage 141 is bored into the valve block above passage 140 and this passage connects with bore 116 from the manifold 77 of the fluid circuit. Mounted in the passage 141 is a plug 142 having a longitudinal bore 143 in which is mounted a check valve 144 held against the end of the plug by a spring 145. The plug 142 has a hole 146 leading into its bore 143 and registering with this hole is a passage 246, shown in dotted lines in Fig. 8, leading to the passage 140 and thence to the slot 108 to the left of the head 97 of the adjusting valve. A hole 147 is bored into the valve block from its rear face intersecting the bore 115 and in this hole a check valve 148 is mounted. The valve works against a seat ground on a shoulder between the hole and a reduced extension 149 of the hole. A port 450 connects the passage 140 with port 149 of the hole 147 and a plug 451 is screwed into the hole 147 to close the same and form an abutment for the spring 152 of the valve 148.

As described above, the direction of the flow of the fluid is reversed when the pump actuating eccentric is adjusted from one side to the other of its no-stroke or zero position and consequently one of the manifolds 76, 77, contains fluid under high pressure when the eccentric is on one side of zero and the other manifold contains the high pressure fluid when the eccentric is on the other side of zero. By the above described mechanism the passage 128 is connected to the high pressure side of the circuit in either position of the eccentric to furnish fluid under pressure to the adjusting cylinders 65, and the passage 140 is always connected to the low pressure side of the circuit whatever the position of the eccentric, to return the fluid from the adjusting cylinders to the main circuit. Assuming that the manifold 76 is in the high pressure side of the circuit, the fluid passes into the valve block through the port 115, thence through the valve 122 in the plug 121 to the passage 128 behind the head 132 of the valve 131. The spring 137 of this valve is of proper size to yield under the pressure of the fluid from the high pressure side of the circuit and allows the valve to move to the left and thereby uncover the port 130 leading to the port 106 of the bore of the adjusting valve, allowing the fluid to enter that port. The port 106 is between the ports 105 and 107 which lead respectively to the rear and front ends of the adjusting cylinders so that movement of the adjusting valve in either direction from the position shown will admit the fluid pressure to the front or rear ends of the adjusting cylinders, thereby shifting the adjusting pistons to the left or right. The movement of the adjusting pistons by the fluid admitted at one end of the cylinders 65 forces a corresponding amount of fluid out at the other end. Assuming the valve 94 to have been moved to the left from the position shown in Fig. 8, thereby connecting the port 106 with the port 107 and the port 104 with the port 105, the fluid under pressure passes into the port 106 through the bore 93 to port 107 and thence through the port 83 to the passages leading to the bores in the forward ends of the adjusting cylinders 65, and shifts the pistons 66 and the adjusting yoke and connected parts to the right as seen in Fig. 1. The movement of the pistons forces a corresponding amount of fluid out through the bores 88 at the rear or closed ends of the cylinders 65 which fluid returns to the valve block through the port 84 with which the port 105 of the valve block registers. From the port 105 the fluid passes through the bore 93 of the adjusting valve between the heads 95 and 96 to the passage 139 and thence through the passage 140 and the hole 146 into the bore of the plug 142 and through the check valve 144 into the passage 116 connected to the then low pressure side of the fluid circuit. When the fluid is circulating in a reverse direction the passage 116 is connected to the high pressure side of the fluid circuit and the passage 115 to the low pressure side. The high pressure fluid will then enter the passage 128 to the adjusting valve from the passage 116 through the check valve 118 and the fluid from the adjusting cylinders will be returned to the low pressure side of the circuit from the passage 140 through the check valve 148 and the passage 115.

The adjusting valve 93 projects rearwardly beyond the valve block (see Fig. 7) and connected to its projecting end is a rod 150 which rod is slidably mounted in a guide cylinder 151 formed in the pump casing. The rod 150 is connected to the valve 93 by means of a T-slot 152 on the rod which embraces a head formed on the valve 93 by a groove 153 so that any lateral displacement of the rod 150 will not be communicated to the valve but will be taken up by the connection. Connected to the rod 150 by means of a pin 154 is a floating lever 155 one end of which is connected by means of a link 158 and eye-bolt 157 with a projection 156 on the yoke 63. The other end of the floating lever 155 is connected by a link 159 to a coupling 310, to which is connected a rod 160 slidingly mounted in the control casing and projecting through the front wall thereof as shown in Fig. 7. A control lever 161 is fulcrumed on the control casing at 162, Fig. 6, and is connected at one end to the projecting end of the rod 160 by means of a link 163. The other end of the control lever extends beyond its fulcrum as shown and is provided with an eye by which it may be connected to any desired operating mechanism or the end of the lever itself may be formed as a handle to be operated directly. A rod 311 is attached to the coupling 310 to form an extension of the rod 160 and this rod works in a housing 314. Mounted in the housing 314 is a plug 313 having a bore in which is mounted a stop member 316 held against the rod 311 by a spring 315 and adapted to engage a notch 312 in the rod 311 when the pump stroke is set at its zero position. Suppose the free end of the lever 161 be moved a short distance to the right as shown in Fig. 7. This operation moves the rod 160 and the attached end of the floating lever 155 to the left and as the lever is connected to both the valve and the yoke and the valve offers substantially no resistance to longitudinal movement, the floating lever turns on its connection to the yoke as a fulcrum and moves the valve to the left from the position shown in Fig. 8, thereby connecting the high pressure port 106 with the port 107 leading to the forward ends of the adjusting cylinders 65 and connecting the rear ends of the cylinders with the low pressure port 104. The fluid pressure in the adjusting cylinders moves the yoke 63 and its connected parts to the right as shown in Fig. 2 and thereby reduces the stroke of the pump in the manner already described. When the yoke 63 moves to the right, the end of the floating lever attached thereto also moves to the right, and as the rod 160 and connected parts offer greater resistance to movement than the valve 94, particularly when the lever 161 is held by the operator, the end of the floating lever attached to the rod 160 acts as a fulcrum and the valve 94 moves to the right until it is restored to normal position in which the adjusting cylinders are cut off from connection with the fluid circuit and the yoke held against further movement.

It will be clear from the above description that the adjusting yoke 63 is moved by the fluid pressure to exactly the same extent that the rod 160 is moved by the hand lever 161 and therefore the stroke of the pump pistons and consequently the speed of the motor is determined by the position of the lever 161.

As explained in my patent and application referred to, it is essential to the proper operation of a hydraulic gear to maintain the fluid circuit completely full of fluid and means are therefore provided to collect all the fluid that may leak past the pump and motor pistons and valves, adjusting pistons, etc., and to pump it back into the fluid circuit. In the cases referred to and also in the present case, the fluid employed is preferably oil which serves the double function of transmitting the power and lubricating the working parts, and in order to have a sufficient supply of fluid to properly lubricate the machine and make up for any possible loss of fluid from the main circuit as through a loose pipe or other defective connection, I maintain in the control casing a supply of fluid in addition to the amount necessary to fill the main circuit. The control casing extends below the pump and motor casing and the above mentioned leakage is collected by the walls of the casing and drains into the bottom of the control casing where it mingles with the surplus oil. Mounted in the control casing 70 below the shaft 17 is a gear pump hereinafter referred to as the leakage pump. This pump comprises a casting 164, attached to the casing 70 by bolts 165 passing through bosses 166 formed in the casing, in which casting is mounted a pair of intermeshing pinions 167, 168 attached respectively to rotating shafts 169, 170 supported at one end in the side wall of the casting 164 and at the other end in a cover plate 171 which forms the opposite wall of the leakage pump casing. Mounted on the shafts 169, 170 between the gears 167, 168 and the cover plate 171, are washers 171$^a$ and 171$^b$ respectively, which washers exactly fill the space between the gears and the cover plate, and are maintained in fluid tight relation with the side faces of the gears. The purpose of this construction is to provide means whereby the wear on the side faces of the gears may be readily taken up. As the gears wear, sheets of paper or other packing may be placed between the cover plate and the washers to hold the washers in close contact with the gears. Formed integral with the shaft 169, or attached thereto, at its end adjacent the front wall of the casing 70 is a pinion 172 meshing with a pinion 473 having driving connection with the shaft 17. The lower portion of the casing 70 is formed as a detachable pan 173. Leading into the suction side of the leakage pump casting 164 is a horizontal bore 174 (Fig. 6) with which a bore 175 connects, and connected to the bore 175 is a pipe 176 closed at its lower end, which extends into the pan 173, the lower portion of the said pipe being perforated and surrounded by a strainer 177 to clean the oil of any grit or other solid particles which it may contain.

The leakage pump is designed to deliver to the main circuits more oil than is necessary to replace the leakage from these circuits and the surplus oil is returned to the suction side of the leakage pump circuit through valves and connections arranged in the valve block in the manner and for a purpose hereinafter set forth. Formed in the casting of the leakage pump on the pressure side is a bore 178 to which is connected a pipe 179 leading through the casing 70 to the cap 80 of the valve block where it connects with a bore 180 (Fig. 9) in the cap which registers with a bore 181 in the valve block leading to a longitudinal passage 182 bored into the block from the front end. Connected to the suction side of the leakage pump through the bore 174 is a pipe 183 (Fig. 6) which extends thereto through the side of the casing 70 from the side wall of the seat 78 in which the valve block is mounted and where it connects with a bore 184 through the wall of the seat which registers with a transverse bore 185 leading from a longitudinal bore 186 forming an enlarged extension of the constant low pressure passage 140. The excess fluid from the pressure side of the leakage pump passes through passages which will be later described, the valve mechanism above referred to and thence through the pipe 183 to the suction side of the leakage pump, and such fluid in passing the point where the bore 175 enters the bore 174 has an injector effect tending to draw other fluid up from the pan 173 to the suction side of the leakage pump thereby reducing the force necessary to drive the leakage pump. As previously stated it is advantageous to make the capacity of the leakage pump great enough to always give an over supply and consequently fluid is returning to the leakage pump through the pipe 183 practically all the time while the machine is running. On this account it is advantageous as regards the efficiency of the machine to arrange the discharge in this manner to reduce the power necessary to run the leakage pump. Also having the discharge connected to the suction side of the leakage pump instead of permitting it to flow off into the casing 70 as heretofore, prevents the said discharge from becoming mixed with air and drawn back later into the fluid circuit in such condition, the operation of the machine being much better when the oil is free of air.

I have explained how the port 106 is automatically supplied with high pressure fluid from the main circuit when there is high pressure fluid in either side of said circuit and how such high pressure fluid is used for operating the pump stroke adjusting mechanism. It is readily seen however that when the pump is at its no-stroke or zero position there is no pumping action and consequently there is no high pressure in either side of the circuit. I have therefore provided the valve mechanism heretofore referred to and which will now be described, for enabling the leakage pump to supply fluid under sufficiently high pressure to operate the stroke adjusting mechanism when there is no high pressure in the main circuit. Connecting with the longitudinal passage 182 of the valve block (Fig. 8) into which the fluid is delivered from the leakage pump through the port 181, is a transverse bore 188, shown dotted in Fig. 8 which leads to the port 110 of the adjusting valve bore, and leading from the adjacent port 109 of the adjusting valve bore is a transverse passage 187, also shown dotted in Fig. 8, which connects with the longitudinal passage 140. The heads 98 and 99 of the adjusting valve 94 and the stem 103 between them are so proportioned that when the valve 94 is in its normal position shown in Fig. 8 fluid may pass from port 110 to port 109 but when the valve is moved a certain distance to either the right or left, heads 99 or 98 respectively close the bore of the adjusting valve between the ports and thereby cut off communication between passages 187 and 188. Mounted in the enlarged extension 186 of the passage 140 is a valve 189 hereinafter referred to as the low pressure relief valve. This valve comprises a head 190 slidably mounted in and normally closing the end of the passage 140 where it joins the enlarged bore 186, the said head having a three-pointed guiding stem extending into the passage 140 and a reduced stem 191 extending into the bore 186. The stem 191 is provided with a collar 192 intermediate its ends and surrounding the stem and engaging the collar and the end plate 193 is a spring 194 adapted to normally move the valve to the right as shown in Fig. 8. Also surrounding the stem 191 and arranged between the head and the shoulder forming the end of the bore 186 around the passage 140 is a spring 195 similar to the spring 194, the springs 194 and 195 being of such length that the entire head 190 lies just within the passage 140. In the normal operation of the machine when the adjusting valve 94 is in the position shown in the drawings, the fluid from the leakage pump passes through the port 103 to the constant low pressure passage 140 whence so much as is necessary to fill the main circuit passes through whichever low pressure check valve 144 or 148 leads to the then low pressure side of the circuit, and the balance blows off through the low pressure relief valve 189 and returns to the leakage pump as described. When there is no high pressure fluid in the main circuit and it is desired to utilize the pressure from the leakage pump to operate the pump stroke adjusting mechanism, the adjusting valve 94 is shifted to either the right or left, according to the direction of rotation of the driven shaft desired, a sufficient distance for the head 99 or the head 98 to close the passage between the ports 110 and 109. As the leakage pump is constantly driven directly from the driving shaft, the pressure of the fluid in the passage 182 begins to rise as soon as the valve 94 is operated as described. Connecting the passage 182 and the passage 129 at a point between the heads 132 and 134 of the valve 131 is a transverse bore 196 and intersecting the bore 196 and also the passage 246 leading to the constant low pressure passage 140, is a longitudinal passage 197 bored into the valve block from the front.

A check valve 198 hereinafter referred to as the high pressure relief valve, is mounted in the passage 197 opening from the bore 196 to the passage 246 and normally held in closed position by a spring 199 surrounding the stem 200 of the valve and abutting against a plug 201 held in the passage by the end plate 193. It will be remembered that the spring 137 of the valve 131 holds the valve when there is no pressure against the head 132 in position to permit communication between passage 129 at the left of the head 132 and the port 130 through which the high pressure fluid is delivered to the adjusting cylinders, hence the fluid from the leakage pump is free to pass into the port 130. When the adjusting valve 94 is shifted to close the port between the passages 187 and 188 of the normal leakage pump circuit the heads 96 and 97 uncover the ports leading to the ends of the adjusting cylinders, connecting one of said ports with the port 130 and the other one with one of the constant low pressure passages 139 or 246. The pressure of the fluid from the leakage pump continues to rise in the bore 196 until it is sufficient to open the high pressure relief valve 198 and permit the fluid to blow off into the low pressure passage 246, but the spring 199 of this valve is of such tension that before this point is reached the pressure is sufficient to operate the pump stroke adjusting mechanism. As soon as the pump is adjusted out of its zero position the pressure in one side or the other of the main circuit rises, which pressure is transmitted to the fluid in the passage 128 where it may be called on for further adjustment of the stroke changing mechanism.

The spring 137 of the valve 131 is sufficiently stiff to hold the valve in the position shown except when the pressure on the head 132 from the high pressure passage, is sufficiently high to operate the stroke adjusting mechanism, but it sometimes happens that the pressure of the fluid about balances the spring 137 so that the head 132 may be moved sufficiently to the left to prevent the fluid from the leakage pump entering the port 130 but not far enough to permit the fluid from the passage 128 to enter the port. To overcome this difficulty I have provided the valve with a bore 202 through which fluid from the leakage pump may pass into the chamber inclosing the valve stem and exert its pressure on the end of the stem to force the valve to the right and establish communication between the middle portion of the bore 129 and the port 130. It will be noted that the bore 129 is counterbored at the point where it crosses the passage 246 so that the head 134 of the valve 131 will not obstruct the passage of fluid through the passage 246.

As shown in Fig. 11, the pipe 214 which conveys oil to the pump crank bearing connects with the passage 450 leading to the constant low pressure passage 140 through a port 460 in the cap 80 of the valve block.

Figure 13:
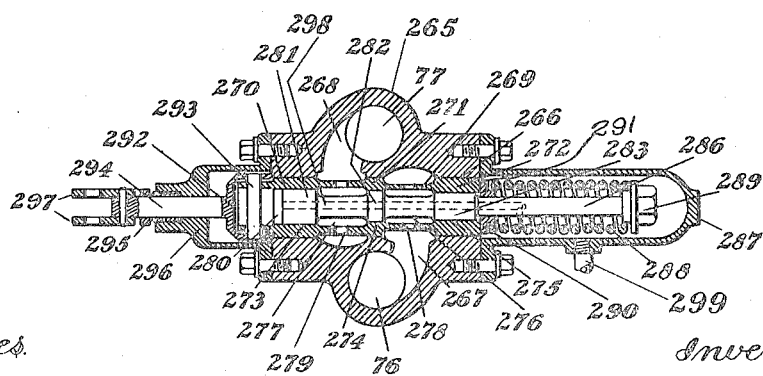

In order to prevent the fluid pressure in the main circuit of the transmission rising above a safe working limit and also to permit the transmission to be rendered inoperative without adjusting the pump pistons to their no-stroke position, I have provided a valve mechanism, which will now be described, between the manifolds 76 and 77 whereby the pump and motor will be automatically short circuited whenever the pressure rises above a predetermined point or may be short circuited at will by the operator. This valve mechanism is located as shown in Fig. 1, and is shown in detail in Fig. 13. At the point where the valve mechanism is mounted the manifolds 76 and 77 are connected by a member 265 forming an integral part of the manifold casting. A bore 266 extends longitudinally through the member 265 and the manifolds 76, 77 are connected to the bore 266 at different points longitudinally thereof by ports 267, 268 respectively. Slidably mounted in the bore 266 is a tubular valve member 269, hereinafter referred to as the by-pass valve, which valve member is provided with three heads 270, 271, 272, the middle one 271 fitting the bore 266 between the ports 267 and 268. Between the heads, the external diameter of the valve member is reduced so that when the member is shifted a sufficient distance to the left from the position shown in Fig. 13 the ports 267 and 268 will be connected and the fluid permitted to pass from one manifold to the other whereby the pump can operate at any stroke without delivering fluid to, or operating the motor, and the motor can be turned by hand or other means and the fluid thus circulated by the motor will be unobstructed. The bore of the valve member 269 comprises three different portions, 273, 274, 275, of different diameters the part 273 at the left as seen in Fig. 13 being larger than the middle portion 274 while the portion 275 at the right is smaller than the portion 274. The three portions of the bore above described are separated from each other by chambers 276 and 277, which chambers are connected by radial holes 278, 279 with the ports 267, 268 leading to the manifolds 76, 77 respectively. Slidably mounted in the bore of the valve 269 is a piston valve 280, having three heads 281, 282 and 283 fitting in the three portions 273, 274, 275 respectively of the bore of the valve 269 and corresponding therewith in diameters. The heads 281, 282 and 283 are separated from each other by reduced portions which, when the valve is in its normal position as shown in Fig. 13, register with the chambers 276, 277 of the by-pass valve. The valve 280 which constitutes the safety valve is provided with a stem 286 extending to the right of the member 265 and inclosed in a housing 287 attached to the said member. A spring 288 surrounds the stem 286, its ends abutting respectively against a nut 289 on the end of the stem and a washer 290 engaging the end of by-pass valve 269. The bore of washer 290 is smaller than the bore of the valve 269 at that point so that the shoulder 291 between the valve 280 and its stem 286 will engage the washer 290 to limit the relative movement of the valves 269 and 280 under the action of the spring 288. The end of the valve 269 projects beyond the member 265 at the left and to its projecting end a yoke 292 is attached by means of a cross pin 293. Integral with this yoke is a stem 294 extending through a stuffing box 295 formed in a housing 296 attached to the member 265. Links 297 are attached to the end of the stem 294 to which any desired operating member for the by-pass may be attached. The valve 280 is provided with a small bore 298 leading from the left end thereof to the stem 286 and through the side of the stem so that any fluid that may leak past either of the valve heads into the housing 296 may pass into the housing 287 and thence through the pipe 299 to the casing.

Assuming the manifold 76 to be the high pressure side of the fluid circuit the fluid therefrom will pass into the port 267 and thence through holes 278 into the chamber 276 between the heads 282 and 283 of valve 280. As the head 282 is larger than the head 283 the pressure from the fluid will tend to move the valve 280 to the left relatively to the valve 269 with a force equal to the difference in the areas of the heads 282 and 283 of valve 280 multiplied by the pressure of the fluid, and the spring 288 is constructed of such tension that the valve will be held against this force until the pressure of the fluid rises above the predetermined desired maximum when the spring will be compressed sufficiently to permit fluid to pass from the manifold 76 to the manifold 77. When the pressure is sufficiently relieved the spring 288 will return the valve to its normal position. When the manifold 77 is the high pressure side of the circuit the fluid passes into the port between the heads 281 and 282 and as the head 281 is larger than the head 282 the pressure of the fluid tends to move the valve to the left against the tension of the spring 288 as before and should the pressure be sufficiently high to overcome the tension of the spring the valve will be shifted and fluid allowed to pass from the manifold 77 to the manifold 76, until the pressure in the manifold 77 falls below the desired maximum. When it is desired to permit the pump and motor to run independently of each other or to permit either to remain stationary while the other is revolving, the valve 269 is moved to the left by means of the operating connections attached to its stem 294 to permit the fluid from either manifold to pass into the other. When the valve 269 is operated as described, the valve 280 being wholly supported by the valve 269 moves with it and hence the relative positions of the valves are not disturbed.

As the pressure in the main circuits sometimes fluctuates rapidly, there is at such times a tendency for the fluid in the passage 128 to surge back and forth with the result that the check valves 118 and 122 would, unless prevented, hammer on their seats and tend thereby not only to hammer themselves to pieces but also make an objectionable noise. To overcome this I have provided these valves with the small cylindrical stems 118$^a$ and 125 respectively working in the reduced bores as described. The valve stems are fitted into their bores so as to have a dashpot effect and thereby prevent too rapid reciprocation of the valves.

The operations of the several parts of the mechanism have been fully described in connection with the description of their construction and I will now briefly describe the operation of the mechanism as a whole.

Assuming the parts to be in the positions shown in the drawings and the shaft 17 to be driven by some external source of power in a clockwise direction when viewed from the left hand end of Fig. 2 or as shown in Fig. 6, the pump pistons deliver fluid under pressure to the outer manifold 77 through their valve chambers, the valve crank pin, in the adjustment of the mechanism shown being 90 degrees behind the crank arm of the pump pistons in this direction of rotation. The fluid pressure from the manifold 77 operates the pistons in the motor cylinders to rotate the motor shaft in a counter clockwise direction, due to the selected arrangement of the motor crank 248 and the motor valve crank pin 258 at its maximum speed.

Should it be desired to reduce the speed, the free end of the control lever 161 is moved to the right a distance corresponding to the change in speed desired, as shown in Fig. 7 or toward the machine and thereby, through the rod 160 and floating lever 155 the valve 94 is moved to the left and communication is established between ports 106 and 107 and between ports 105 and 104.

The high pressure being in the outer manifold 77 the fluid therefrom passes into the port 112 and passage 116 and thence through the check valve 118 into the passages 128 and 129 between the head 132 of the valve 131 and the end of the passage 129. The pressure of the fluid forces the valve to the left as shown in Fig. 8 uncovering the port 130 leading to the port 107. The port 107 having been connected to the port 106 as described, the fluid passes into the port 106 and thence through the ports and passages in the casings 70 and 71 to the front ends of the adjusting cylinders, thereby moving the pistons 66 and the attached yoke 63 to the right. The movement of the yoke causes the sleeve 54 to turn on the shaft 17 in a clockwise direction by reason of the threads and nut 56, 57, and, through the gears 53, 52 causes the eccentric bushing 19 to turn on the crank 18 thereby shortening the crank arm of the pump pistons and reducing the quantity of fluid delivered to the motor and consequently the speed of the motor. Should it be desired to reverse the direction of rotation of the motor the control lever 161 is moved toward the machine to a position sufficiently beyond its position which corresponds with the zero or no stroke position of the pump, to give the desired reverse speed. When the lever is so moved the yoke is moved as before by the pressure of the fluid in the main circuit until the pump reaches its zero position, but at this point there ceases to be, for obvious reasons, any working pressure in the main circuits and therefore the movement of the yoke momentarily ceases. When however the valve 94 has been moved far enough for the head 98 to cut off communication between the passages 187 and 188 of the normal leakage pump circuit, the pressure from the leakage pump rises in the passage 196 and the passage 129 between the heads of the valve 131 which portion of the passage 129 is, when there is no pressure against the head 132 of the valve 131, in communication with the bore 130 leading to the port 106. The port 106, by the movement of the valve 94 has been connected to the port 107 leading to the adjusting cylinders so that when the pressure rises sufficiently the adjusting yoke is shifted and the rotation of the eccentric bushing continued. Now, however, the stroke of the pump pistons is increasing instead of decreasing, thereby increasing the amount of fluid delivered to the motor and consequently accelerating the speed of the motor, but as the eccentric bushing rotates at twice the angular velocity of the valve crank pin 32, the relative positions of the real crank arm of the pump pistons and the crank arm of the valve crank pin are reversed and consequently the inner manifold 76 now becomes the high pressure side of the circuit and as the relative position of the motor crank and the motor valve crank pin remains fixed, the direction of rotation of the motor is reversed. When it is desired to reduce the speed of reverse rotation or again drive the motor in the first described direction the control lever is moved in the opposite direction or away from the machine. The yoke 63 will then be shifted in the opposite direction by fluid pressure from the manifold 76 which enters the high pressure passage of the valve block through the port 115 and check valve 122 and passes through the port 105 to the rear ends of the adjusting cylinders, the fluid from the other side of the pistons 66 returning to the manifold 77 through the ports 107, 108, passage 246 and check valve 144, the leakage pump supplying the fluid pressure as before to shift the adjusting mechanism from one side to the other of its zero position.

As stated above, my present invention is an improvement on the transmission mechanisms constituting the subject matter of my prior patent and application referred to and as such it embodies improvements in various parts of the mechanism and a reorganization of the transmission whereby such improved mechanisms may properly coöperate to obtain a maximum efficiency of operation of the mechanism as a whole. Notable among the improvements presented in this application may be mentioned the formation of the adjusting cylinders in the pump casing between the pump cylinders whereby greater compactness is obtained and the use of pipe connections between the adjusting valve mechanism and the cylinders is avoided. The arrangement of the adjusting valves in a single valve block also constitutes a distinct improvement. By this arrangement numerous pipe connections, which are more or less subject to leakage are dispensed with, the single packing between the valve block and its casing being easily made fluid tight. Furthermore, the entire valve mechanism is readily removable for inspection or repairs or a new valve block may be substituted in a few moments without special fitting or adjustment. The forged steel cylinders and valve chambers are also a distinct improvement and my improved copper packing permits their use with the integrally cast connecting manifolds.

While the above mentioned and other novel features disclosed all coöperate, as stated, in the attainment of a unitary result, many of such features have other useful applications and I have therefore claimed the same both *per se* and in combination with the coöperating parts of the transmission.

The V-shaped notches in the edges of the active heads of the pump valves which are shown in the drawings of this case are not claimed herein, but are described and claimed in my copending application No. 606,618, filed February 4, 1911. Also claimed in my copending application is the zero stop device shown in Fig. 17 of the drawings of this case.

I claim:

1. In a machine of the class described, the combination of a crank shaft, a crank casing in which said shaft is rotatably supported, said crank casing having a double series of bores arranged radially around the center of rotation of said crank shaft, a plurality of separate forged steel cylinders and integral valve chambers having screw threaded ends projecting into said bores with flanges engaging the casing around said bores, clamping nuts on said screw threaded ends within said crank casing, the angle of slope of the sides of the thread of the said cylinder and valve chamber ends which are in compression when the said nuts are tightened up, being less than the angle the sine of which represents the coefficient of friction between the said sides of the threads of the said cylinder and valve chamber ends and their respective nuts, and pistons and valves mounted in said cylinders and valve chambers respectively and operatively connected to said crank shaft, substantially as described.

2. In a variable capacity pump, the combination of a crank shaft, a crank casing in which said shaft is rotatably supported, a plurality of pump cylinders radially mounted on said crank casing, pistons in said cylinders, connections between said pistons and crank shaft adjustable to vary the stroke of said pistons and means for adjusting said connections comprising cylinders formed in said crank casing between each two adjacent pump cylinders with their axes parallel with said shaft, pistons in said cylinders, a longitudinally shiftable member on said shaft connected to said stroke adjusting means, connections between said member and said pistons, and means for controlling the admission of fluid pressure to said cylinders, substantially as described.

3. In a variable capacity pump, the combination of a plurality of pump cylinders having pistons operating therein, a central casing on which said pump cylinders are radially arranged, fluid operated means for varying the capacity of said pump comprising adjusting cylinders formed in said central casing and arranged between said pump cylinders, bores in said central casing interconnecting said adjusting cylinders, pistons in said adjusting cylinders operatively connected to said capacity varying means, and means for controlling the admission of fluid pressure to said interconnecting bores, substantially as described.

4. In a variable stroke pump, the combination of a plurality of pump cylinders having pistons operating therein, a central casing on which said cylinders are radially arranged, fluid operated means for varying the capacity of said pump comprising adjusting cylinders formed in said central casing and arranged between said pump cylinders, a series of bores in said central casing interconnecting said adjusting cylinders at one end, a second series of bores in said central casing connecting the other ends of said adjusting cylinders, pistons in said adjusting cylinders operatively connected to said stroke varying means, and means for admitting fluid pressure to either of said series of bores to shift said pistons in either direction, substantially as described.

5. In a variable capacity pump, the combination of a plurality of radially arranged pump cylinders and valve chambers, said valve chambers having ports for the admission of fluid, a manifold for connecting said valve chambers having ports registering with said ports in the valve chambers, said manifold having fluid tight connections with said valve chamber ports comprising oppositely tapered counterbores formed in said registering ports of the valve chambers and manifold and thin compressible bushings in said bores having their outer surfaces tapered to correspond with the said bores, substantially as described.

6. In a variable capacity pump, the combination of a plurality of radially arranged pump cylinders and valve chambers, said valve chambers having ports for the admission of fluid, a manifold for connecting said valve chambers having ports registering with said ports in the valve chambers, said manifold having fluid tight connections with said valve chamber ports comprising oppositely tapered counterbores formed in said registering ports of the valve chambers and manifold, and thin compressible bushings in said bores having their outer surfaces tapered to correspond with the said bores, and means for holding the faces of said valve chambers and manifolds adjacent said bores in contact, substantially as described.

7. In a hydraulic transmission, the combination of a pump having a plurality of radial cylinders and valve chambers, a port in the side wall of each of said valve chambers for the transmission of fluid, a motor having a plurality of radial cylinders and valve chambers, a port in the side wall of each of said motor valve chambers and a manifold forming an intermediate connecting member between said pump and motor said manifold having a continuous circular passage provided with ports registering with the ports of said pump and motor valve chambers, and having fluid tight connections therewith, substantially as described.

8. In a hydraulic transmission, the combination of a pump having a plurality of radial cylinders and valve chambers, ports in the side walls of said valve chambers for the passage of fluid thereto and therefrom, a motor having a plurality of radial cylinders and valve chambers, ports in the side walls of the motor valve chambers, a manifold member forming an intermediate connection between the pump and motor, said manifold member having two concentric circular passages provided with ports registering with the ports of the pump and motor valve chambers and having fluid tight connections therewith, substantially as described.

9. In a hydraulic transmission, the combination of a pump having a plurality of radial cylinders and valve chambers, ports in the side walls of said valve chambers for the passage of fluid thereto and therefrom, a motor having a plurality of radial cylinders and valve chambers, ports in the side walls of the motor valve chambers, a manifold member forming an intermediate connection between the pump and motor, said manifold member having two concentric circular passages provided with ports registering with the ports of the pump and motor valve chambers and having fluid tight connections therewith comprising oppositely tapered counterbores formed in said registering ports with their largest diameters at their meeting edges and compressible bushings having correspondingly tapered outer surfaces in said counterbores, substantially as described.

10. In a hydraulic transmission, the combination of a pump having a cast central casing and rigidly attached forged steel cylinders and valve chambers, a motor having a cast central casing and rigidly attached forged steel cylinders and valve chambers, intake and delivery ports in the side walls of said pump and motor valve chambers, a manifold member forming an intermediate connection between the pump and motor, said manifold member consisting of a single casting and comprising a central chamber rigidly connected to the central casing of the pump and the central casing of the motor and two concentric circular passages provided with ports registering with the ports of the pump and motor valve chambers and having fluid tight connections therewith, substantially as described.

11. In a hydraulic transmission, the combination of a pump comprising a central casing, radially arranged cylinders mounted thereon with pistons operating therein, a motor adapted to be driven by fluid pressure from the pump, passages for conducting fluid under pressure from the pump to the motor and returning the fluid from the motor to the pump, means for operating the pump pistons adjustable to vary the stroke of said pistons and means for adjusting the said piston operating means comprising adjusting cylinders formed in said central casing between the pump cylinders a series of circumferential bores in said central casing interconnecting said cylinders at one end a second series of bores interconnecting said cylinders at their other ends, longitudinal bores in said central casing connecting respectively with the said two series of bores, a valve mechanism for controlling the admission of fluid to said adjusting cylinders, a casing for said valve mechanism attached to said central casing and having bores registering with the longitudinal bores of the pump casing and having fluid tight connection therewith, substantially as described.

12. In a variable capacity pump, the combination of fluid pressure generating elements, means for varying the volumetric capacity of said elements, fluid pressure operated means for actuating said capacity varying means comprising a plurality of control valves, a valve block in which said valves are mounted, interconnecting ports and passages between the said valves formed in the said block, and means for connecting certain of said ports and passages with the said fluid pressure operated means, substantially as described.

13. In a variable capacity pump, the combination of fluid pressure generating elements, means for varying the volumetric capacity of said elements, fluid pressure operated means for actuating said capacity varying means comprising a cylindrical valve block having a plurality of bores therein, a plurality of control valves mounted in said bores, ports and passages formed in said valve block interconnecting the bores of said control valves and means for connecting certain of said ports and passages with the said fluid pressure operated means, substantially as described.

14. In a variable capacity pump having fluid pressure operated means for varying its capacity, the combination of a cylindrical valve block having a plurality of longitudinal bores therein from one end thereof, a plurality of control valves mounted in said bores, ports and passages in said valve block interconnecting said valve containing bores, an end plate attached to said block closing said longitudinal bores, and means for connecting certain of said ports and passages to said fluid pressure operated means, substantially as described.

15. In a variable capacity pump having fluid pressure operated means for varying its capacity, the combination of a cylindrical valve block having a plurality of longitudinal bores therein and a plurality of transverse bores opening through the side wall thereof and interconnecting certain of said longitudinal bores, control valves in certain of said bores, a casing for said valve block having fluid tight engagement with the curved surface of said valve block, thereby closing certain of said transverse bores, and means for connecting certain of said ports and passages to said fluid pressure operated means, substantially as described.

16. In a variable capacity pump having fluid pressure operated means for varying its capacity, the combination of a valve block having a plurality of interconnecting ports and passages bored therein from the side and end walls thereof, control valves in certain of said passages, an end plate attached to said block, a two-part casing inclosing said block and adapted to be clamped into fluid tight engagement with said block, and means for connecting certain of said ports and passages with said fluid pressure operated means, substantially as described.

17. In a variable capacity pump having fluid pressure operated means for varying its capacity, the combination of a valve block having a plurality of ports and passages therein, certain of said ports and passages being interconnected, means for delivering fluid under pressure from said variable capacity pump to one of said passages, a secondary pump, means for conveying fluid under pressure therefrom to another of said passages, means for connecting other of said ports and passages to said fluid pressure operated means, and control valves mounted in said block for regulating the admission of fluid to said last named passages from either of said first named passages, substantially as described.

18. In a hydraulic transmission having a closed circuit, the combination with a variable stroke pump adapted to supply fluid pressure to either side of its circuit according to the adjustment of its stroke, of fluid pressure operated means for adjusting the pump stroke comprising a valve block, a plurality of ports and passages therein, means for connecting two or said ports (115, 116) with either side of said circuit respectively, check valves mounted in said valve block and adapted to permit fluid to pass from either of said ports to a third port or passage, other check valves in said block opening into said two first mentioned ports respectively from a fourth passage (140) of said block and means for connecting said third and fourth passages to said fluid pressure operated means, substantially as described.

19. In a hydraulic transmission having a closed circuit the combination with a variable stroke pump adapted to supply fluid pressure to either side of the circuit according to the adjustment of its stroke, of fluid pressure operated means for adjusting the pump stroke comprising a valve block having a plurality of ports and passages therein, valve mechanism in said block adapted to connect one of the passages of said block to whichever side of said circuit is the high pressure side, a secondary pump, means for connecting said pump to another of said passages to deliver fluid thereto, a valve mechanism in said block adapted to connect the first mentioned passage to a third of said passages when the pressure in said first passage is above a certain predetermined minimum, and to connect said second mentioned passage to said third passage when the pressure in said first passage is below said minimum, and means for connecting said third passage to said fluid pressure operated mechanism, substantially as described.

20. In a hydraulic transmission, the combination with a variable stroke pump and a motor, of passages connecting said pump and motor and constituting therewith a fluid circuit either side of which may be the high pressure side according to the adjustment of the stroke of said pump, a valve mechanism for interconnecting said passages comprising a valve chamber having ports leading from different points thereof to said passages respectively, a valve mounted in said chamber, a spring holding said valve in position to normally close said chamber between said ports and means whereby fluid pressure in either of said passages above a predetermined maximum will move said valve against the tension of said spring and connect the said ports, substantially as described.

21. In a hydraulic transmission, the combination with a variable stroke pump and a motor, of passages connecting said pump and motor and constituting therewith a fluid circuit either side of which may be the high pressure side according to the adjustment of the stroke of said pump, a valve mechanism for interconnecting said passages comprising a valve chamber having ports leading from different points thereof to said passages respectively, a valve mounted in said chamber normally closing said chamber between the ports, means whereby said valve may be shifted at will to connect said ports, a passage in said valve interconnecting said ports, a second valve carried by said first valve, a spring holding said second valve in position to normally close said passage and means whereby fluid pressure in either of said circuit passages above a predetermined maximum will move said second valve against the tension of said spring and interconnect the said circuit passages, substantially as described.

22. In a hydraulic transmission, the combination with a variable stroke pump and a motor, of passages connecting said pump and motor and forming therewith a fluid circuit either side of which may be the high pressure side or the low pressure side according to the adjustment of the stroke, and means for lubricating a bearing of said transmission comprising passages leading to said bearing and having fluid connection with said circuit and a valve mechanism for maintaining the fluid pressure in said passage always equal to the pressure in the low pressure side of the circuit irrespective of the adjustment of the pump stroke, substantially as described.

23. The combination with a pump having high pressure and low pressure sides to its fluid circuit, of means for collecting leakage and for storing a reserve supply of fluid, a secondary pump having a suction and a pressure side for pumping reserve and leakage fluid to the low pressure side of said fluid circuit in greater volume than fluid leaks from said circuit, and means for conducting the excess fluid supplied by the said secondary pump from the low pressure side of said circuit direct to the suction side of said secondary pump, substantially as described.

24. The combination with a main fluid pump, of means for collecting leakage therefrom and for storing a reserve supply of fluid, a secondary pump for pumping to the main pump reserve and leakage fluid in greater volume than the fluid leaks therefrom, and means for discharging the excess fluid supplied by said secondary pump direct from the main pump to the said secondary pump, substantially as described.

25. The combination with a main fluid pump, of means for collecting leakage therefrom and for storing a reserve supply of fluid, a secondary pump for pumping to the main pump reserve and leakage fluid in greater volume than the fluid leaks therefrom, means for discharging the excess fluid supplied by said secondary pump direct from the main pump to the said secondary pump and means for causing said discharge to suck up extra reserve and leakage fluid and inject it into said secondary pump, substantially as described.

26. In a fluid pressure pump, the combination with cylinders and coöperating pistons of a main driving shaft having a crank pin and eccentric bushing rotatably adjustable on said crank pin, means embodying a screw for varying the position of said eccentric bushing, a nut slidably mounted on said screw, a sleeve, shoe and slot connections between said nut and said sleeve, and means for sliding said nut with respect to said screw and said sleeve, substantially as described.

27. In a fluid pressure pump, the combination with cylinders, coöperating pistons and a main driving shaft, of means embodying a screw for varying the length of stroke of said pistons, a nut slidably mounted on said screw, a sleeve surrounding said nut and provided with shoe and slot connection thereto, and means for sliding said nut with respect to said screw and said sleeve while they and the nut are rotating together, substantially as described.

28. In a pump, the combination of a crank shaft embodying a primary crank pin eccentric to said shaft, a bushing having an eccentric bore therein rotatably mounted on said crank pin and embodying gear teeth concentric with said crank pin, a sleeve rotatably mounted on and concentric to said shaft and connected to said bushing by gear teeth meshing with the teeth of said bushing, a nut slidably mounted with respect to said sleeve and said shaft and having shoe and slot connections therewith, one of which is spiral, and means for sliding said nut with respect to said sleeve and said shaft, substantially as described.

29. In a fluid pressure variable stroke pump, the combination with means operated by fluid pressure for adjusting said stroke, of means for collecting fluid leakage in said pump, an auxiliary pump for returning said collected leakage to the said pump, means for utilizing in the said stroke adjusting means fluid pressure generated by said auxiliary pump, means for controlling the said stroke adjusting means and means coöperating with said controlling means for connecting the said auxiliary pump to the said stroke adjusting means, substantially as described.

30. In a pump, the combination of a crank shaft and an eccentrically bored bushing with connections between the same embodying a spur gear coacting with an internal gear, a sleeve, a nut slidably mounted with respect to said shaft and said sleeve and having shoe and slot connections, one of which is spiral, with said shaft and said sleeve, and means for sliding said nut, substantially as described.

31. In a variable stroke piston pump, the combination of a double supported crank shaft embodying a crank pin formed thereon between the said supports, an eccentrically bored bushing rotatably mounted on said crank pin with means for rotating said bushing on said crank pin to adjust the length of stroke of the piston, a valve crank relatively fixed with respect to said shaft except when said bushing is rotated on said crank pin, and means for maintaining the said valve crank always in quadrature with respect to a line joining the center of the crank shaft and the center of the exterior surface of the eccentric bushing, except when the said centers are coincident, substantially as described.

32. In a variable stroke piston pump, the combination of a crank shaft embodying a crank pin formed thereon, an eccentrically bored bushing rotatably mounted on said crank pin to adjust the length of stroke of the said piston, a valve crank rotatably mounted on said shaft and a double eccentric carried by said bushing coöperating with double slots carried by said valve crank connecting the said bushing to said valve crank, substantially as described.

33. In a variable stroke piston pump, the combination of a double supported crank shaft embodying a crank pin formed thereon between the said supports, an eccentrically bored bushing rotatably mounted on said crank pin to adjust the length of stroke of the said piston, a valve crank rotatably mounted on one of the said supports, and a double eccentric carried by said bushing coöperating with double slots carried by said valve crank connecting the said bushing to said valve crank, substantially as described.

34. In a variable stroke piston pump, the combination of a double supported crank shaft embodying a crank pin formed thereon between the said supports, an eccentrically bored bushing rotatably mounted on said crank pin to adjust the length of stroke of the piston, a valve crank rotatably mounted in one of the said supports of the crank shaft, and means for causing the said valve crank to rotate around the said shaft at one half the angular rate that the eccentrically bored bushing is rotated around the said crank pin, substantially as described.

35. In a pump, the combination with means embodying a crank shaft for varying its stroke, of a screw thread secured to the said crank shaft, a nut slidably mounted on said thread, a sleeve coacting with said nut and the said stroke varying means, a yoke journaled on said sleeve, and means for moving said yoke to vary the said stroke, substantially as described.

36. In a pump, the combination with means embodying a crank shaft for varying its stroke, of a screw thread secured to the said crank shaft, a nut slidably mounted on said thread, a sleeve coacting with said nut and the said stroke varying means, a yoke journaled on said sleeve, and power operated means for moving said yoke to vary the said stroke, substantially as described.

37. In a pump, the combination with means for varying its stroke embodying a crank shaft with a crank pin formed thereon and a bushing eccentrically mounted on said crank pin, of a screw thread secured to said crank shaft, a nut slidably mounted on said thread, a sleeve surrounding said nut which is slidably connected thereto, means connecting the said sleeve to the said bushing, and means for sliding the said nut with reference to said sleeve and said thread to rotate the said bushing on the said crank pin to vary the said stroke, substantially as described.

38. In a variable stroke fluid pressure pump, the combination with means operated by fluid pressure for varying the said stroke, of means for obtaining the said fluid pressure for the stroke varying means from the pump under certain conditions, means for obtaining the said fluid pressure from an auxiliary pump under other conditions, and a valve automatically acting to determine the source of said fluid pressure supply, substantially as described.

39. In a variable stroke fluid pressure pump, the combination with means operated by fluid pressure for varying the said stroke, of means for obtaining the fluid pressure for operating the said stroke varying means from a multiple number of sources, means automatically acting to determine the source of said fluid pressure supply, and means for preventing the said source determining means from maintaining a neutral position in changing from one source to another, subsubstantially as described.

40. In a variable stroke pump embodying fluid pressure operated means for varying the stroke, the combination with multiple control valves therefor, of a valve block in which the said multiple valves are mounted, interconnecting ports and passages between the said valves formed in the said block and means for connecting certain ports and passages of the said block with the said fluid operated stroke varying means, substantially as described.

41. In a variable stroke pump embodying fluid pressure operated means for varying the stroke, the combination with multiple control valves therefor, of a cylindrical valve block in which the said valves are mounted, interconnecting ports and passages between the said valves formed in the said block, and means for connecting certain of the ports and passages of the said block with the said fluid operated stroke varying means, substantially as described.

42. In a pump, the combination with fluid pressure generating elements, of mechanism for varying the volumetric capacity per cycle of operation of the said generating elements, passages leading to and from said generating elements, power operated means for actuating said capacity varying mechanism, said means comprising a cylinder provided with a piston connected to said mechanism, a valve block having a bore, a piston valve working in said bore, passages leading from the ends of said cylinder to said valve block, passages leading from the passages of said generating elements to said valve block, passages in said valve block for connecting said passages with said valve bore, and heads on said piston valve adapted on movement of said valve to direct the fluid from the high pressure passages of said generating elements to either end of said cylinder and the fluid from the opposite end of said cylinder to the low pressure passages of said generating elements.

43. In a pump, the combination with fluid pressure generating elements of mechanism for varying the volumetric capacity of said generating elements and reversing the direction of the flow of fluid produced by said elements, passages leading to and from said generating elements and constituting high and low pressure passages according to the direction of the flow of fluid, power operated means for actuating said capacity varying mechanism, said means comprising a cylinder provided with a piston connected to said mechanism, a valve block having a bore, a piston valve working in said bore, pipes leading from the ends of said cylinder to said valve block, passages in said valve block connecting said pipes with said valve bore, pipes leading from the passages of said pressure generating elements to said valve block, passages in said valve block connecting with said last named pipes, passages in said valve block leading from different parts of said valve bore, check valves, permitting fluid to pass from the passages of said generating elements to one of said valve bore passages, check valves permitting fluid to pass from other of said valve bore passages into the passages of said generating elements, whereby certain of said passages will always contain fluid at high pressure and other of said passages will contain fluid at low pressure regardless of the direction of the flow of fluid, and heads on said piston valve adapted on movement of said valve to direct the fluid from the high pressure passages to either end of said cylinder and the fluid from the opposite end of said cylinder to the low pressure passages.

In testimony whereof, I have signed my name to this specification, in the presence of two subscribing witnesses, this 11th day of July, 1911.

CHARLES MATTHEWS MANLY.

Witnesses:
SIGMUND NEWMAN,
ADA I. MILLER.